United States Patent
Murao

(10) Patent No.: US 11,256,034 B2
(45) Date of Patent: Feb. 22, 2022

(54) METHOD FOR MANUFACTURING INTEGRATED OPTICAL MODULE

(71) Applicant: Mitsubishi Electric Corporation, Tokyo (JP)

(72) Inventor: Tadashi Murao, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/133,858

(22) Filed: Dec. 24, 2020

(65) Prior Publication Data

US 2021/0116643 A1    Apr. 22, 2021

Related U.S. Application Data

(63) Continuation of application No. PCT/JP2018/026742, filed on Jul. 17, 2018.

(51) Int. Cl.
  *G02B 6/293*    (2006.01)
  *G02B 6/13*    (2006.01)
  (Continued)

(52) U.S. Cl.
  CPC ............ *G02B 6/2938* (2013.01); *G02B 6/13* (2013.01); *G02B 6/2848* (2013.01);
  (Continued)

(58) Field of Classification Search
  CPC .... G02B 6/13; G02B 6/2848; G02B 6/29365; G02B 6/2938; G02B 6/4206; G02B 6/4246; G02B 2006/12088; H04J 14/02
  See application file for complete search history.

(56) References Cited

U.S. PATENT DOCUMENTS 6,301,407 B1    10/2001   Donaldson
7,674,999 B2 *   3/2010   Jennings ............ B23K 26/0738
                                                          219/121.65
(Continued)

FOREIGN PATENT DOCUMENTS

JP    2010-175875 A    8/2010
JP    2019-50242 A     3/2019
(Continued)

OTHER PUBLICATIONS

International Search Report issued in PCT/JP2018/026742, dated Oct. 9, 2018.

*Primary Examiner* — Daniel Petkovsek
(74) *Attorney, Agent, or Firm* — Birch, Stewart, Kolasch & Birch, LLP

(57)    ABSTRACT

There are provided: a plurality of optical elements for handling light having different wavelengths; a plurality of collimating lenses individually provided in the optical elements, each of the collimating lenses having a first end facing a main surface of one of the optical elements; an optical multi-demultiplexer using reflection of light caused by a spatial optical system, the optical multi-demultiplexer having a first end facing a second end of each of the collimating lenses; a coupling lens having a first end facing a second end of the optical multi-demultiplexer; an SMF having one end facing a second end of the coupling lens; and an optical block, which is transparent, provided on an optical path between each of the collimating lenses and the optical multi-demultiplexer, the optical path having a small number of reflections in the optical multi-demultiplexer.

1 Claim, 6 Drawing Sheets

(51) Int. Cl.
*G02B 6/28* (2006.01)
*G02B 6/12* (2006.01)
*H04J 14/02* (2006.01)

(52) U.S. Cl.
CPC .............. *G02B 6/29365* (2013.01); *G02B 2006/12088* (2013.01); *H04J 14/02* (2013.01)

(56) References Cited

U.S. PATENT DOCUMENTS

| | | | |
|---|---|---|---|
| 8,303,195 B2 * | 11/2012 | Adachi | H01L 31/153 |
| | | | 385/93 |
| 8,488,244 B1 | 7/2013 | Li et al. | |
| 9,746,412 B2 | 8/2017 | Chen | |
| 10,768,383 B2 * | 9/2020 | Koyama | G02B 6/4239 |
| 2008/0013955 A1 | 1/2008 | Takano et al. | |
| 2016/0349470 A1 | 12/2016 | Cheng | |

FOREIGN PATENT DOCUMENTS

| | | |
|---|---|---|
| JP | 2019-109390 A | 7/2019 |
| WO | WO 2006/006197 A1 | 1/2006 |
| WO | WO 2008/012200 A2 | 1/2008 |

* cited by examiner

US 11,256,034 B2

METHOD FOR MANUFACTURING INTEGRATED OPTICAL MODULE

CROSS REFERENCE TO RELATED APPLICATION

This application is a Continuation of PCT International Application No. PCT/JP2018/026742, filed on Jul. 17, 2018, which is hereby expressly incorporated by reference into the present application.

TECHNICAL FIELD

The present invention relates to a method for manufacturing an integrated optical module.

BACKGROUND ART

An optical transmission transceiver used in, for example, a data center includes an optical transmission module mounted with a laser diode (LD) and an optical reception module mounted with a photo diode (PD).

A traditional optical transmission module for 10 gigabit Ethernet (GbE) includes one lane. That is, the optical transmission module is mounted with one LD, and outputs one wave of signal modulated at 10 Gbps to one single mode optical fiber (SMF).

In contrast, an optical transmission module for 100 GbE for the purpose of 10 km communication or 40 km communication includes four lanes. That is, the optical transmission module is mounted with four LDs having different emission wavelengths, synthesizes four waves of signals modulated at 25 Gbps, and outputs the signals to one SMF.

Furthermore, an optical transmission module for 400 GbE for the purpose of 2 km communication or 10 km communication includes eight lanes. That is, the optical transmission module is mounted with eight LDs having different emission wavelengths, synthesizes eight waves of signals of 50 Gbps modulated at 25 GBaud PAM4, and outputs the signals to one SMF. Furthermore, the optical transmission module may include four lanes. In this case, the optical transmission module is mounted with four LDs having different emission wavelengths, synthesizes four waves of signals of 100 Gbps modulated at 50 GBaud PAM4, and outputs the signals to one SMF.

As described above, the optical transmission module for 100 GbE or 400 GbE includes many lanes. Consequently, in the field of optical transmission module manufacturing, an LD and an optical multiplexer multiplexing light beams emitted from the LD are commonly being integrated in the same package for the purpose of downsizing. The optical multiplexer may use a planar optical circuit or a spatial optical system including a mirror and an optical component such as a bandpass filter (BPF), and the latter is often advantageous in terms of cost.

A traditional optical transmission module for 10 GbE includes only one lane, and thus a lens and an SMF is easily aligned. That is, in the optical transmission module, a maker is only required to fix a lens with respect to an LD and further adjust the position of the SMF so that the coupling efficiency is maximized.

In contrast, when an optical multiplexer using a spatial optical system is applied to an optical transmission module for 100 GbE or 400 GbE, it is necessary to generate collimated beams from LD light at a collimating lens, multiplex the beams in the optical multiplexer, and then couple the multiplexed beam to the SMF via a coupling lens.

Beam eccentricity and a beam deflection angle are, however, generated in the collimated beam obtained by the multiplexing of the optical multiplexer. The beam eccentricity is a parallel positional deviation, which causes a loss caused by incident angular deviation of light to the SMF. Furthermore, the beam deflection angle is angular deviation, which causes a loss caused by focal point deviation with respect to the SMF.

Consequently, even if alignment is performed so that the coupling efficiency is maximized for certain one lane, the coupling efficiency is not necessarily maximized for other lanes. Thus, it is important to perform the alignment so that the coupling efficiency is maximized for all lanes in the optical transmission module. That is, it is necessary to adjust the position of the collimating lens and the angle of the optical multiplexer so that the beam eccentricity and the beam deflection angle in each lane are minimized, and further adjust the position of the coupling lens and the position of the SMF so that the efficiency of coupling with the SMF is maximized for all lanes.

Furthermore, there is known a method for changing a light beam direction (beam deflection angle and states of collimation) by giving an operation signal from outside to a liquid crystal element or a non-linear optical element disposed on an optical path (e.g., see Patent Literature 1).

CITATION LIST

Patent Literature

Patent Literature 1: JP 2010-175875 A

SUMMARY OF INVENTION

Technical Problem

In order to perform an alignment maximizing the coupling efficiency for all lanes, however, it is necessary to adjust the positions or angles of many members (collimating lens, optical multiplexer, coupling lens, and SMF), which causes problems of complicated assembly process and long cycle time of assembly.

Furthermore, the method disclosed in Patent Literature 1 can be expected to have a certain effect in improving the coupling efficiency. The method, however, needs an operation signal from outside and a special element for responding to the operation signal, thus having a problem of high cost.

Note that although, in the above description, the optical transmission module has been described, the same applies to an optical reception module.

The present invention has been made to solve the above-described problems, and an object thereof is to provide a method of manufacturing an integrated optical module including many lanes, the integrated optical module being capable of achieving high coupling efficiency for all lanes without adjusting the positions and angles of an optical multi-demultiplexer and a coupling lens.

Solution to Problem

A method for manufacturing an integrated optical module according to the present invention including: a plurality of optical elements handling light having different wavelengths; a plurality of collimating lenses individually provided in the optical elements, each of the collimating lenses having a first end facing a main surface of one of the optical elements; an optical multi-demultiplexer using reflection of light caused by a spatial optical system, the optical multi-demultiplexer having a first end facing a second end of each of the collimating lenses; a coupling lens having a first end facing a second end of the optical multi-demultiplexer; a single mode optical fiber having one end facing a second end of the coupling lens; and an optical block, which is transparent, provided on one optical path among a plurality of optical paths between the collimating lenses and the optical multi-demultiplexer, the one optical path having a small number of reflections in the optical multi-demultiplexer, the method comprising: fixing the optical multi-demultiplexer firmly; adjusting a position of each of the collimating lenses and a position of the single mode optical fiber for corresponding one of the optical paths and actually measuring a shift amount of the single mode optical fiber at which a coupling efficiency is maximized with respect to a shift amount of each of the collimating lenses; calculating the position of the single mode optical fiber and an angle of the optical block at which a maximum value of beam eccentricity is minimized by referring to the actual measurement result; and adjusting and fixing the position of each of the collimating lenses, the position of the single mode optical fiber, and the angle of the optical block by referring to the calculation result.

Advantageous Effects of Invention

According to the present invention, with the above-described configuration, high coupling efficiency can be achieved for all lanes without adjusting the positions and angles of an optical multi-demultiplexer and a coupling lens in an integrated optical module having many lanes.

DESCRIPTION OF EMBODIMENTS

Figure 1:
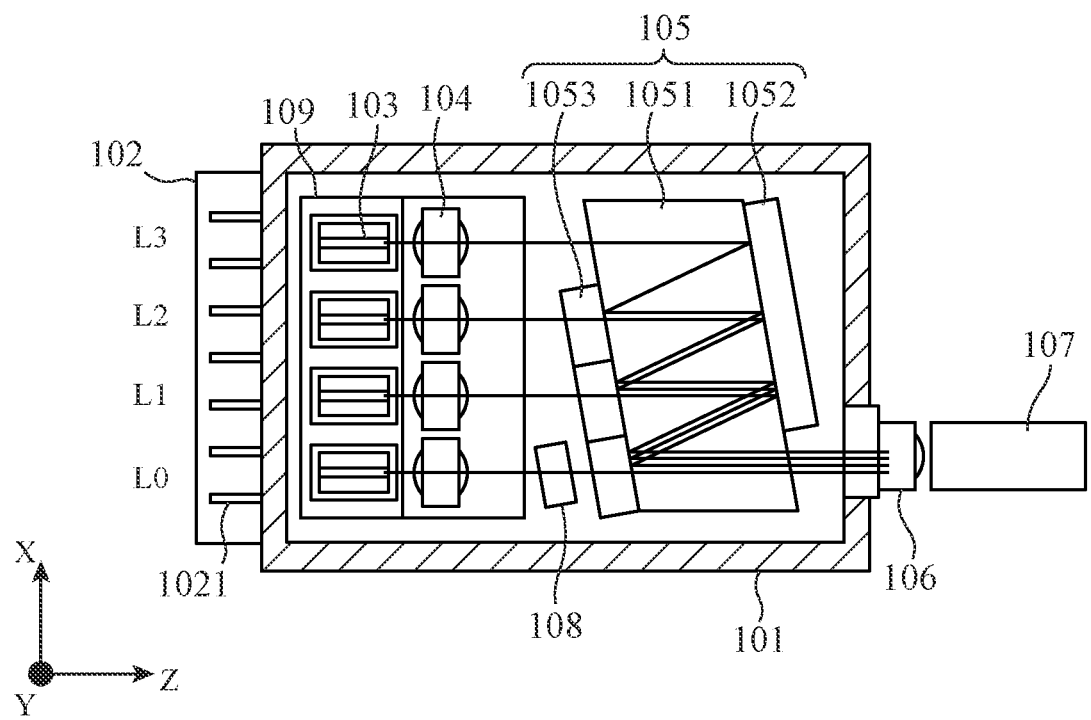
FIG. 1 is a top view illustrating an example of the configuration of an optical transmission module according to a first embodiment of the present invention (in the case where four lanes are provided).

Hereinafter, embodiments of the present invention will be described in detail by referring to the drawings.

First Embodiment

FIG. 1 is a top view illustrating an example of the configuration of an optical transmission module according to a first embodiment of the present invention. An optical transmission module will be described below as one example of an integrated optical module (optical transmission and reception module). A case where the optical transmission module includes four lanes is described below as one example.

As illustrated in FIG. 1, the optical transmission module includes a package 101, a feedthrough 102, a plurality of light emitting elements (LDs) 103, a plurality of collimating lenses 104, an optical multiplexer (optical multi-demultiplexer) 105, a coupling lens 106, an SMF 107, and an optical block 108. The optical transmission module in FIG. 1 includes four LDs 103 and four collimating lenses 104.

The package 101 is a housing in which optical members (LD 103, collimating lens 104, optical multiplexer 105, and optical block 108) are mounted. In FIG. 1, the package 101 includes a metal member. Furthermore, FIG. 1 illustrates the package 101 with a part removed, and illustrates the inside of the optical transmission module.

The feedthrough 102 can feed power from the outside of the package 101 to the LD 103 mounted inside the package 101 through a conductive unit 1021.

The plurality of LDs 103 are optical elements that emit light having different wavelengths.

The collimating lens 104 is individually provided at each of the LDs 103, and has one end facing the light emitting surface (main surface) of the LD 103. The collimating lens 104 generates a collimated beam from light emitted from the LD 103, which the collimating lens 104 faces, and emits the collimated beam.

In FIG. 1, optical systems (sets of LD 103 and collimating lens 104) are mounted on a carrier 109 provided in the package 101, each of the optical systems being mounted on the corresponding lane of the lanes consisting of the 0th lane (L0) to the third lane (L3).

The optical multiplexer 105 has one end facing the other end of each collimating lens 104, and multiplexes collimated beams emitted from each collimating lens 104. The optical multiplexer 105 uses the reflection of light caused by a spatial optical system. The optical multiplexer 105 in FIG. 1 includes a holder 1051, a mirror 1052, and a plurality of BPFs 1053.

The mirror 1052 is bonded at one end (on the side near to the coupling lens 106) of the holder 1051, the mirror 1052 being on all the lanes except one lane (L0 in FIG. 1) corresponding to an emission end of the optical multiplexer

105. The mirror 1052 reflects the light incident from a certain lane to a position of a lane next to the certain lane on the side of the BPFs 1053.

The plurality of BPFs 1053 is bonded at the other end (on the side near to the collimating lens 104) of the holder 1051, the BPFs being on all the lanes except one lane (L3 in FIG. 1) farthest from the lane corresponding to the emission end of the optical multiplexer 105. The BPF 1053 transmits only the light incident from the lane to which the BPF 1053 is bonded, and reflects light of other wavelengths.

The coupling lens 106 has one end facing the other end of the optical multiplexer 105, and collects the collimated beams obtained by the multiplexing of the optical multiplexer 105.

The SMF 107 has one end facing the other end of the coupling lens 106, and the collimated beams collected by the coupling lens 106 is incident on the SMF 107.

The optical block 108 is provided on one optical path among the optical paths between collimating lenses 104 and the optical multiplexer 105, the one optical path being the path having the smallest number of reflections in the optical multiplexer 105. In FIG. 1, the optical block 108 is provided on the optical path of L0. The optical block 108 is a parallel plate-shaped transparent member capable of adjusting beam eccentricity by varying the mounting angle. Here, something being transparent means that the something has a light transmittance of equal to or greater than 25%, and the optical block 108 is made of, for example, glass or resin.

Note that, usually, the refractive index of the optical block 108 is not 1. For this reason, when a collimated beam propagating in space is incident on the optical block 108, Fresnel reflection occurs in the optical block 108, causing a decrease in the transmittance of the optical block 108. Consequently, the optical block 108 may be provided with nonreflective coating on the incident side and the emission side.

Furthermore, the package 101 may be provided with an alignment mark for the purpose of fixing (passively aligning) the optical multiplexer 105.

Figure 2:
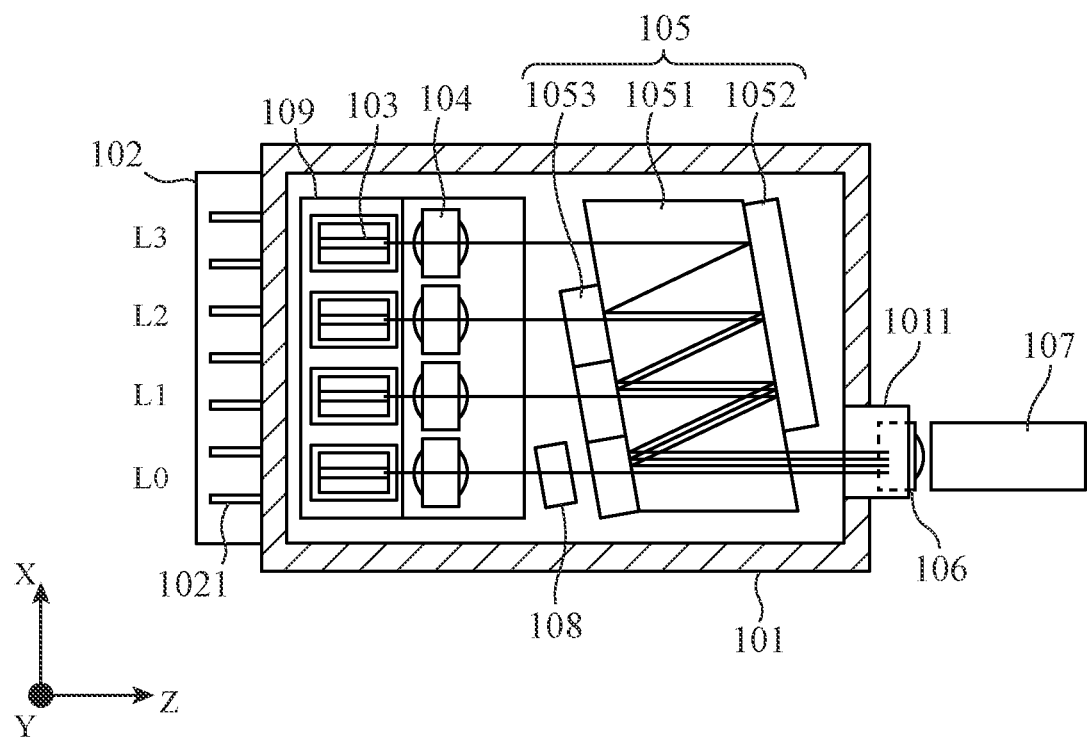
FIG. 2 is a top view illustrating another example of the configuration of the optical transmission module according to the first embodiment of the present invention (in the case where four lanes are provided).

Furthermore, as illustrated in FIG. 2, the package 101 may be provided with a fitting part 1011 for the purpose of fixing (passively aligning) the coupling lens 106. In this case, the coupling lens 106 is mounted in the package 101 by being fitted into the fitting part 1011.

Although FIGS. 1 and 2 illustrate a case where the optical transmission module includes four lanes, the optical transmission module may include equal to or more than 4 lanes by increasing the number of the LD 103, the collimating lens 104, and the BPF 1053.

Furthermore, FIGS. 1 and 2 illustrate the optical transmission module as an integrated optical module. In contrast, when the integrated optical module is an optical reception module, the LD 103 is changed to a light reception element (PD), and the optical multiplexer 105 is changed to an optical demultiplexer (optical multi-demultiplexer) in FIGS. 1 and 2. Note that PDs are of different optical elements that receive different wavelength lights. Furthermore, the optical demultiplexer divides the beam incident from the coupling lens 106, and emits the divided beams to the collimating lenses 104.

An example of the operation of the optical transmission module according to the first embodiment will now be described.

In the optical transmission module according to the first embodiment, first, the LD 103 emits light, and the collimating lens 104 generates a collimated beam from the light emitted from the LD 103 in each lane.

The optical multiplexer 105 then multiplexes the collimated beams, each of the collimated beams being generated by the corresponding collimating lens 104 in the corresponding lane. At this time, in the optical multiplexer 105, the mirror 1052 reflects the incident collimated beam to a position of the next lane on the side of the BPFs 1053. Furthermore, each BPF 1053 bundles the collimated beam incident from the corresponding collimating lens 104 in the corresponding lane and the corresponding collimated beam reflected by the mirror 1052. Here, to bundle beams means to put beams together into one beam in such a manner that each lane has the same (substantially the same) beam eccentricity and beam deflection angle.

Then, the coupling lens 106 collects the collimated beam obtained by the multiplexing of the optical multiplexer 105, and couples the collimated beam with the SMF 107.

Here, the beam eccentricity is caused not only by the positional deviation and the angular deviation of the preliminarily mounted LD 103 but by the positional deviation of the collimating lens 104 and the angular deviation of the optical multiplexer 105.

Furthermore, the beam deflection angle is caused by the positional deviation of the collimating lens 104.

In contrast, in conventional alignment methods, it is necessary to adjust the position of a collimating lens so as to minimize the beam deflection angle, to adjust the angle of an optical multiplexer so as to minimize the beam eccentricity, and furthermore to adjust the position of a coupling lens and the position of an SMF so as to maximize the efficiency of coupling with the SMF for all lanes.

In contrast, in the optical transmission module according to the first embodiment, the angle of the optical multiplexer 105 and the position of the coupling lens 106 are fixed (passively aligned) without being adjusted (actively aligned).

Suppose the optical transmission module according to the first embodiment does not have the optical block 108, then the alignment will be performed only at the collimating lens 104 and the SMF 107. Furthermore, when the angle of the optical multiplexer 105 is not adjusted, the only way to adjust the beam eccentricity is by adjusting the position of the collimating lens 104. In contrast, when the position of the coupling lens 106 is fixed without being adjusted, a mounting deviation of approximately ±150 μm usually occurs with respect to the design center in a direction (in the XY plane in FIG. 1) perpendicular to the optical axis. Then, because the position of the coupling lens 106 is not adjusted, the adjustment of the beam eccentricity by customarily considering only the deviation between lanes will be insufficient. What is meant is, matching the absolute position of the beam with respect to the coupling lens 106 in all lanes is necessary for inhibiting loss caused by incident angular deviation of light to the SMF 107. The adjustment of the position of the collimating lens 104 in the XZ plane will be described below, and the same applies to the adjustment of the position in the YZ plane.

Figure 3:
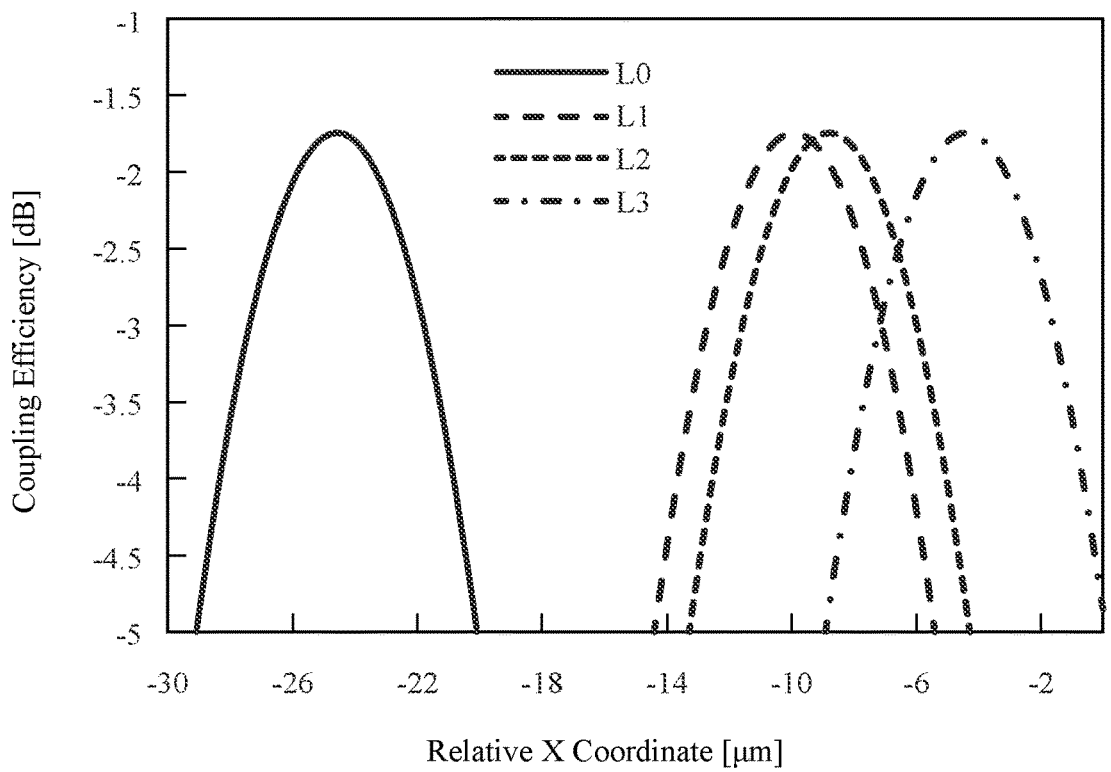
FIG. 3 illustrates a coupling efficiency in each lane in the case where the position of a collimating lens is adjusted so that loss caused by incident angular deviation of light to an SMF is minimized in an integrated optical module (in the case where no optical block is provided) in FIGS. 1 and 2.

FIG. 3 illustrates a coupling efficiency for each lane in the case where the position of the collimating lens 104 is adjusted so as to minimize the loss caused by incident angular deviation of light to the SMF 107. In FIG. 3, the horizontal axis represents the position (relative X coordinate) of the SMF 107, and the vertical axis represents the coupling efficiency.

In FIG. 3, the X-direction mounting deviation of the LD103 provided in L0 is 0, the X-direction mounting deviation of the LD103 provided in L1 is −20 μm, the X-direction mounting deviation of the LD103 provided in L2 is +20 μm, and the X-direction mounting deviation of the LD 103 provided in L3 is −30 μm. Furthermore, in FIG. 3, the angular deviation of the SMF 107 in the XZ plane is −0.5°, and the deviation amount of the SMF 107 from the focal length of the coupling lens 106 in the Z direction (optical-axis direction) is +60 μm. Then, under the condition, it is assumed that the position of the collimating lens 104 is adjusted so that the absolute position of a beam matches the coupling lens 106 in which mounting deviation has occurred.

In this case, the position of the SMF 107 where the coupling efficiency is maximized (hereinafter, referred to as peak alignment coordinates) varies in each lane. This is because, if the beam eccentricity is minimized only by adjusting the position of the collimating lens 104, the beam deflection angle does not become zero. What is meant is, that this is because of the following. The smaller the lane number becomes (e.g., L0), the smaller the number of reflections in the optical multiplexer 105 becomes. The smaller the number of reflection becomes, the more the amount of shifting the collimating lens 104 necessary to shift the beam position of the same amount becomes. The more the amount of shifting the collimating lens 104 becomes, the more the amount of shifting the angular of the beam becomes. The more the amount of shifting the angular of the beam becomes, the more the deviation amount of the peak alignment coordinates becomes. This leads to variations of the peak alignment coordinates in each lane. In order to couple all lanes to the SMF 107 with high efficiency, adjustment of the position of the collimating lens 104 is necessary so as to match (substantially match) the peak alignment coordinates in the respective lanes to each other. When the position of the collimating lens 104 is shifted in the X direction, the focal point coordinates are shifted by the angular shift of a beam, and as a result, the peak alignment coordinates can be shifted, and can be set to a certain position (hereinafter, referred to as a coordinate target).

Figure 4:
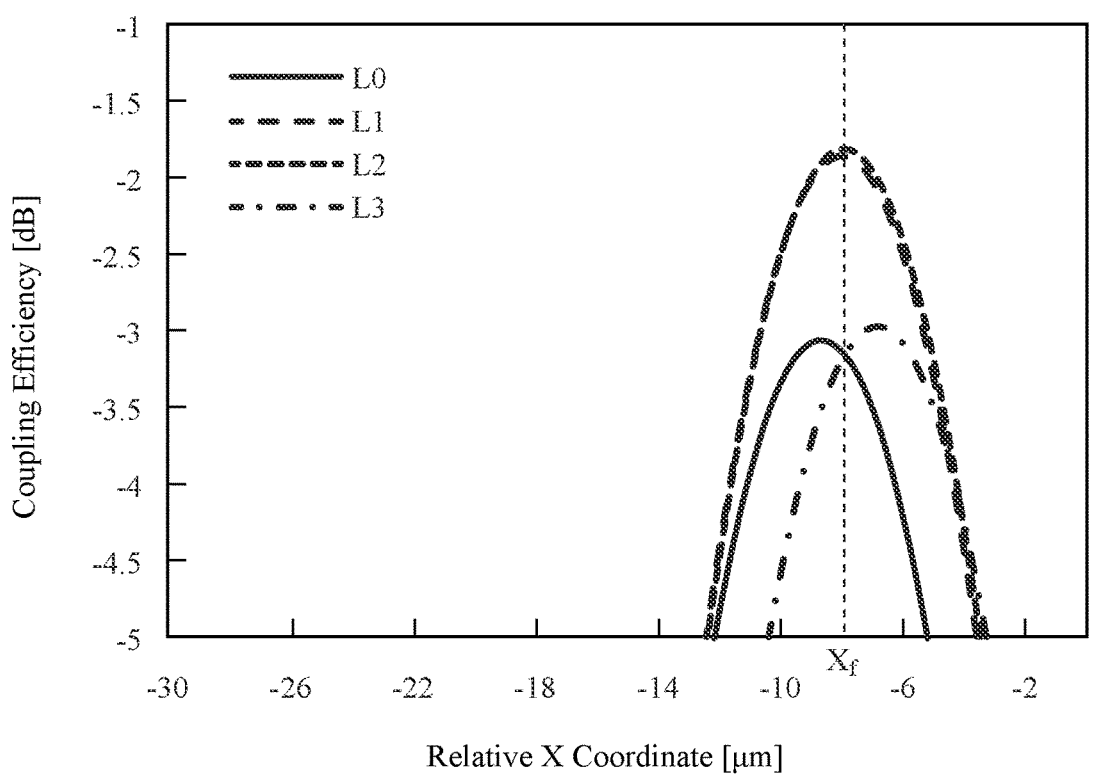
FIG. 4 illustrates a coupling efficiency in each lane in the case where the position of the collimating lens is adjusted with respect to the position of the SMF where the coupling efficiency is maximized for all lanes in the integrated optical module (in the case where no optical block is provided) in FIGS. 1 and 2.

FIG. 4 illustrates a coupling efficiency in each lane in the case where the position of the collimating lens 104 is adjusted with respect to the position of the SMF 107 where the coupling efficiency is maximized for all lanes. In FIG. 4, the horizontal axis represents the position (relative X coordinate) of the SMF 107, and the vertical axis represents the coupling efficiency. Furthermore, in FIG. 4, $X^f$ represents the coordinate target of the SMF 107. An example where $X^f$=−8 μm is shown.

In this case, the loss caused by incident angular deviation of light to the SMF 107 varies in each lane. This is because of the following. The larger the lane number becomes (e.g., L3), the larger the number of reflections in the optical multiplexer 105 becomes. The larger the number of reflections becomes, the more the amount of positional shift of a beam due to the same amount of shift of the collimating lens 104 becomes. The more the amount of positional shift of a beam becomes, the more the loss caused by incident angular deviation of light to the SMF 107 becomes. Moreover, when the SMF 107 is deviated in the +Z direction with respect to the focal length of the coupling lens 106, the positional shift of the beam acts to reduce the shift amount of the peak alignment coordinates due to the angular shift of the beam. Consequently, a larger positional shift of the collimating lens 104 is required to obtain a desired shift amount of the peak alignment coordinates, leading to an increase in the loss caused by incident angular deviation of light to the SMF 107.

From the above reason, an appropriate coordinate target of the SMF 107 is closer (FIG. 4) to the peak alignment coordinates with respect to a lane with a large lane number than an average of the peak alignment coordinates of each lane of the case where an alignment such that the loss caused by incident angular deviation of light to the SMF 107 is minimized has been performed (FIG. 3). In contrast, the deviation amount of the peak alignment coordinates with respect to the lane with a small lane number is large, and thus, when the collimating lens 104 is shifted for the purpose of shifting the peak alignment coordinates, a required shift amount is increased, and the loss caused by incident angular deviation of light to the SMF 107 cannot be ignored.

Furthermore, even if the position of the collimating lens 104 is adjusted so as to match the peak of a coupling efficiency curve with the coordinate target of the SMF 107, the coupling efficiency is not necessarily maximized due to the loss caused by incident angular deviation of light to the SMF 107, and the coupling efficiency may be reduced (see L0 and L3 in FIG. 4).

Figure 5:
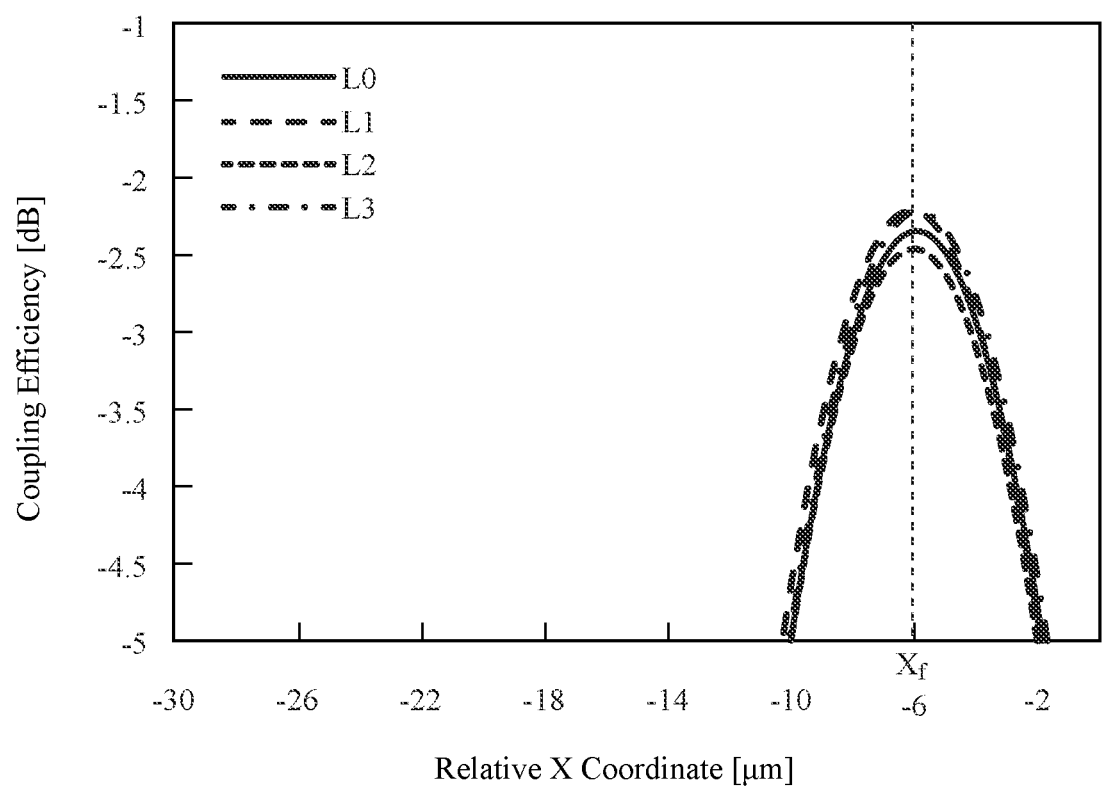
FIG. 5 illustrates a coupling efficiency in each lane in the case where the position of the collimating lens is adjusted with respect to the position of the SMF where the coupling efficiency is maximized for all lanes in the integrated optical module (in the case where an optical block is provided) in FIGS. 1 and 2.

FIG. 5 illustrates a coupling efficiency in each lane in the case where the position of the collimating lens 104 is adjusted with respect to the position of the SMF 107 where the coupling efficiency is maximized for all lanes in the case where the optical block 108 is provided as in the optical transmission and reception module according to the first embodiment. In FIG. 5, the horizontal axis represents the position (relative X coordinate) of the SMF 107, and the vertical axis represents the coupling efficiency.

In FIG. 5, the case where the optical block 108 (BK7) having a thickness of d=0.5 mm and a refractive index of n=1.5 is disposed so as to be in the orientation of θ=−15° with respect to the Z direction is assumed.

Here, the optimum coordinate target of the SMF 107 is set to $X^f$=−6 μm. Furthermore, the amount of correction of the beam eccentricity performed by the optical block 108 can be calculated by the following expression (1) on the basis of Snell's law. In the expression (1), $D_c$ is the amount of correction of the beam eccentricity. Furthermore, in FIG. 5, the amount of correction of the beam eccentricity is $D_c$=−44.8 μm.

$$D_c = d/\cos\{\mathrm{Sin}^{-1}(\sin\theta/n)\} \times \sin\{\theta - \mathrm{Sin}^{-1}(\sin\theta/n)\} \quad (1)$$

Then, in L0, applying beam eccentricity correction of several tens of microns performed by the optical block 108 enables the peak alignment coordinates with respect to L0 to be closer to the peak alignment coordinates with respect to a lane with a large lane number. As described above, the smaller lane number leads to the smaller loss caused by incident angular deviation of light to the SMF 107 along with the shift of the peak alignment coordinates caused by the shift of the collimating lens 104. Consequently, even the optical block 108 capable of beam eccentricity correction of approximately several tens of microns has a large effect in reducing the loss caused by incident angular deviation of light to the SMF 107. As a result, high coupling efficiency can be maintained even when the peak alignment coordinates for L0 is brought close to the peak alignment coordinates for a lane with a large lane number.

From the above discussion, bringing the coordinate target of the SMF 107 close to the peak alignment coordinates for a lane with a large lane number can reduce the shift amount of the peak alignment coordinates required in the lane with the large lane number, and can reduce the loss caused by incident angular deviation of light to the SMF 107. Furthermore, reducing the loss caused by incident angular deviation of light to the SMF 107 in all lanes by using the optical block 108 can make the maximum condition of the coupling efficiency be satisfied even when the position of the collimating lens 104 is adjusted to match the peak of the coupling efficiency curve in each lane with the coordinate target of the SMF 107.

A method for manufacturing the integrated optical module according to the first embodiment will now be described by referring to FIG. 6.

Figure 6:
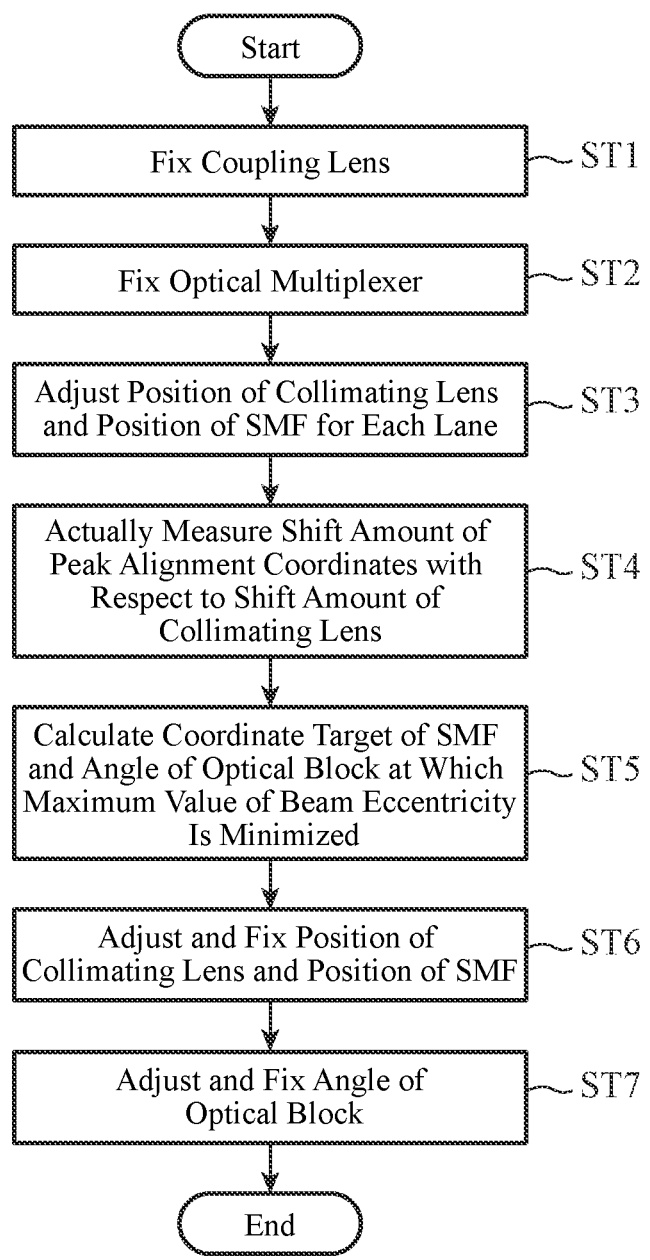
FIG. 6 is a flowchart illustrating an example of a method for manufacturing the optical transmission module according to the first embodiment of the present invention.

In the method for manufacturing the integrated optical module, as illustrated in FIG. 6, a maker first fixes (passively aligns) the coupling lens 106 (Step ST1).

Then, the maker fixes (passively aligns) the optical multiplexer 105 (Step ST2).

Note that FIG. 6 illustrates a case where the maker fixes the optical multiplexer 105 after fixing the coupling lens 106. This is, however, not a limitation, and the maker may fix the coupling lens 106 after fixing the optical multiplexer 105.

Then, the maker adjusts (actively aligns) the position of the collimating lens 104 and the position of the SMF 107 in each lane (each optical path), and actually measures the shift amounts of the peak alignment coordinates with respect to the shift amounts of the collimating lenses 104 (Steps ST3 and ST4).

Then, the maker calculates the coordinate target of the SMF 107 and the angle of the optical block 108 at which the maximum value of the beam eccentricity is minimized by referring to the actual measurement result in Step ST4 (Step ST5).

Then, the maker adjusts and fixes the position of the collimating lens 104 and the position of the SMF 107 by referring to the calculation result in Step ST5 (Step ST6).

Then, the maker adjusts and fixes the angle of the optical block 108 (Step ST7).

Note that FIG. 6 illustrates a case where the maker adjusts and fixes the angle of the optical block 108 after adjusting and fixing the position of the collimating lens 104 and the position of the SMF 107. This is, however, not a limitation, and the order of the process of adjusting and fixing the position of the collimating lens 104, the process of adjusting and fixing the position of the SMF 107, and the process of adjusting and fixing the angle of the optical block 108 can be appropriately changed.

Here, the position of the collimating lens 104 in the i-th lane is defined as $x_i$, and the peak alignment coordinates of the SMF 107 with respect to the i-th lane is defined as $X_i$. Furthermore, the focal length of the collimating lens 104 is defined as $f_0$, and the focal length of the coupling lens 106 is defined as $f_1$. Furthermore, the beam eccentricity caused by $x_i$ is defined as $C_i$, and the deviation amount of the SMF 107 from $f_1$ in the optical-axis direction is defined as Z. In this case, the following expression (2) is established. It should be noted that, in the expression (2), the spot size ratio of the SMF 107 and the LD 103 is assumed to be equal to $f_1/f_0$.

$$\partial X_i/\partial x_i = (f_1/f_0) - 0.5 \times \partial C_i/\partial x_i \times Z/f_1 \qquad (2)$$

Furthermore, a value of $X_i$ which has been found by the adjustment in Step ST3 is defined as $X_i^p$, and a value of $x_i$ is defined as $x_i^p$. Furthermore, the coordinate target of the SMF 107 is defined as $X^f$. A shift amount of peak alignment coordinates necessary in this case is expressed in the following expression (3). Note that, in the expression (3), $\delta X_i^{shift}$ is a necessary shift amount of the peak alignment coordinates. $D_c^i$ is an eccentricity correction amount in the i-th lane, is equal to the value of $D_c$ in a lane in which the optical block 108 is disposed, and is equal to the value of 0 in a lane in which the optical block 108 is not disposed.

$$\delta X_1^{shift} = X^f - X_i^p + 0.5 \times D_c^i \times Z/f_1 \qquad (3)$$

In this case, a beam eccentricity amount generated by $\delta X_i^{shift}$ is expressed in the following expression (4). Note that, in the expression (4), $\delta X_i^{shift}$ is a beam eccentricity amount.

$$\delta C_1^{shift} = (\partial C_i/\partial x_i)/(\partial X_i/\partial x_1) \times \delta X_1^{shift} + D_c^1 \qquad (4)$$

Here, in the optical multiplexer 105 in FIG. 1, $(\partial C_i/\partial x_i)$ is a constant that does not depend on $x_i$, and defined as $C_i'$. Furthermore, if Z is fixed, $(\partial X_i/\partial x_i)$ is determined as a constant by the expression (2) and the above description, and defined as $X_i'$. In this case, the expression (4) is changed to the following expression (5).

$$\delta C_i^{shift} = (C_i'/X_i') \times \delta X_i^{shift} + D_c^i \qquad (5)$$

In the expression (5), $C_i'$ is determined by an optical path length, an incident angle of light to the BPF 1053, and the dimension between the mirror 1052 and the BPF 1053, and these are known values since these are usually known as design values. In contrast, Z, which is the deviation amount of the SMF 107 from $f_1$ in the optical-axis direction, is usually difficult to know. So as a conclusion, only $X_i'$ becomes an unknown amount. Then, the maker finds $X_i'$ by comparing the value obtained by the actual measurement in Step ST4 and the expression (2).

Furthermore, as illustrated in the expression (5), $\delta C_i^{shift}$ depends on $X^f$, and thus $X^f$ and $D_c^i$ that minimize the maximum value of $|\delta C_i^{shift}|$ can be calculated in Step ST5. This corresponds to the fact that the balance of losses caused by incident angular deviation of light to the SMF 107 is kept between the lanes and the position of the SMF 107 and the angle of the optical block 108 that maximize the coupling efficiencies of all lanes are found.

Furthermore, the position for fixing the collimating lens 104 may be determined by using a value obtained by the following expression (6) or by fixing the coordinate target of the SMF 107 and adjusting (actively aligning) the position of the collimating lens 104. Here, $x_i^{opt}$ represents the position for fixing the collimating lens 104.

$$x_i^{opt} = x_i^p + \delta X_i^{shift}/X_i' \qquad (6)$$

Effects of the optical transmission module according to the first embodiment will now be described.

Even when the optical multiplexer 105 and the coupling lens 106 are passively aligned, the optical transmission module according to the first embodiment can inhibit the variation of the losses caused by incident angular deviation of light to the SMF 107 between lanes, and achieve high coupling efficiency. In this case, the optical transmission module according to the first embodiment can perform alignment so as to match the peak of the coupling efficiency curve in each lane with the coordinate target of the SMF 107. Thus, the optical transmission module according to the first embodiment can reduce the change in coupling efficiency with respect to the positional change over time of the collimating lens 104 owing to a small differential coefficient, and achieve high reliability. Consequently, the optical transmission module according to the first embodiment can reduce members for active alignment, and achieve a simplified assembly process and a reduced cycle time of assembly. Furthermore, the optical transmission module according to the first embodiment can obtain the above-described effects by adjusting the angle of the optical block 108, and achieve high coupling efficiency without using an operation signal from outside or a special element that responds to the operation signal, thereby solving the cost problem.

As illustrated above, according to the first embodiment, an integrated optical module includes: a plurality of optical elements for handling light having different wavelengths; a plurality of collimating lenses 104 individually provided in the optical elements, each of the collimating lenses having one end facing a main surface of one of the optical elements; an optical multi-demultiplexer using reflection of light caused by a spatial optical system, the optical multi-demultiplexer having one end facing another end of each of the collimating lenses 104; a coupling lens 106 having one end facing another end of the optical multi-demultiplexer; an SMF 107 having one end facing another end of the coupling lens 106; and an optical block 108, which is transparent, provided on an optical path between each of the collimating lenses 104 and the optical multi-demultiplexer, the optical path having a small number of reflections in the optical multi-demultiplexer. As a result, the integrated optical module according to the first embodiment can achieve high coupling efficiency for all lanes without adjusting the positions and angles of the optical multi-demultiplexer and the coupling lens 106.

Second Embodiment

Figure 7:
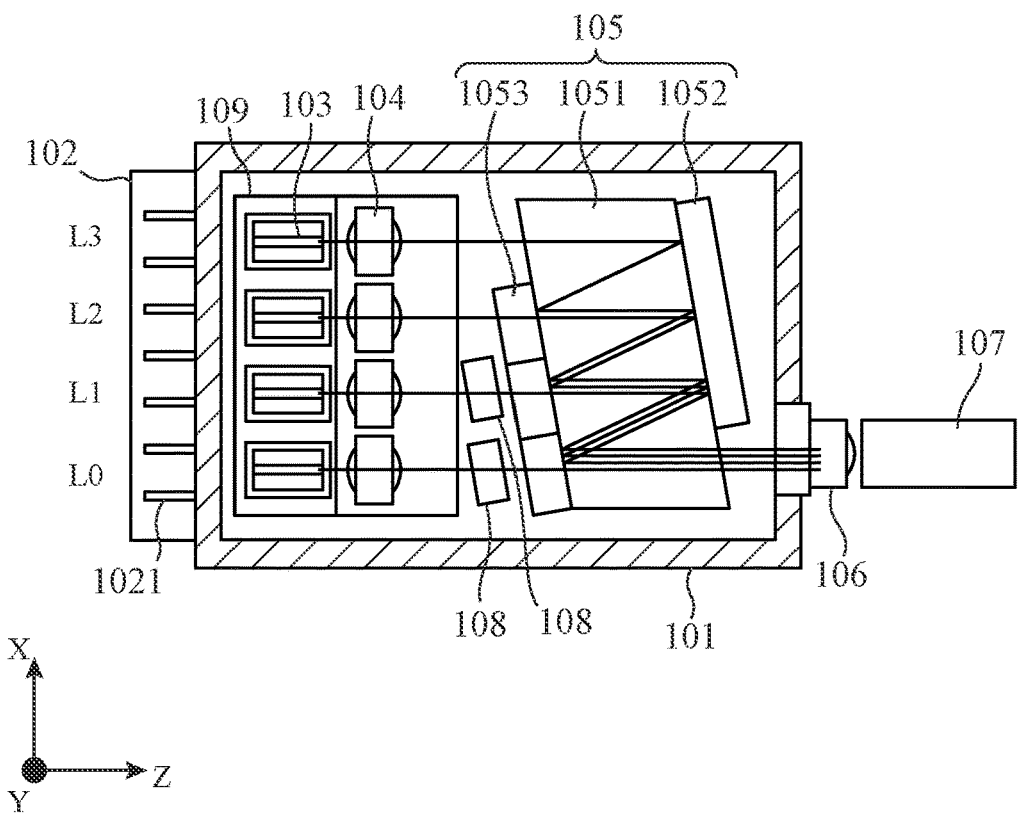
FIG. 7 is a top view illustrating an example of the configuration of an optical transmission module according to a second embodiment of the present invention (in the case where four lanes are provided).

FIG. 7 is a top view illustrating an example of the configuration of an optical transmission module according to a second embodiment of the present invention. In the optical transmission module according to the second embodiment in FIG. 7, two optical blocks 108 are provided when compared to the optical transmission module according to the first embodiment in FIG. 1. Other configurations are similar, and thus the same signs are given and the description thereof is omitted.

The optical blocks 108 are provided on two optical paths among the optical paths between the collimating lenses 104 and the optical multiplexer 105, the two optical paths being an optical path having the smallest number of reflections and an optical path having the second smallest number of reflections, the reflections being reflections in the optical multiplexer 105.

The optical transmission module according to the second embodiment can adjust the beam eccentricity with respect to L0 and L1 with the optical block 108 by mounting the optical block 108 on an optical path of L1 in addition to an optical path of L0. Consequently, the optical transmission module according to the second embodiment reduces the loss caused by incident angular deviation of light to the SMF 107 not only for L0 but for L1 when the position of the collimating lens 104 is adjusted so that the peak alignment coordinates are shifted to match the coordinate target of the SMF 107.

Although, in the above description, the optical transmission module is described as one example of the integrated optical module, the same applies to the optical reception module.

As described above, according to the second embodiment, the optical blocks 108 are provided on two optical paths among the optical paths, the two optical paths being the optical path having the smallest number of reflections and an optical path having the second smallest number of reflections, the reflections being reflections in the multi-demultiplexer. This configuration enables the integrated optical module according to the second embodiment to further inhibit the variation of coupling efficiencies between lanes in addition to the effects described in the first embodiment, thereby achieving higher coupling efficiency.

In the above description, the case where the optical blocks 108 are each provided on the optical paths of L0 and L1 is illustrated. This is, however, not a limitation. It is sufficient to have the optical block 108 being provided on at least one optical path between the collimating lens 104 and the optical multi-demultiplexer, the at least one optical path having a small number of reflections in the optical multi-demultiplexer.

Figure 8:
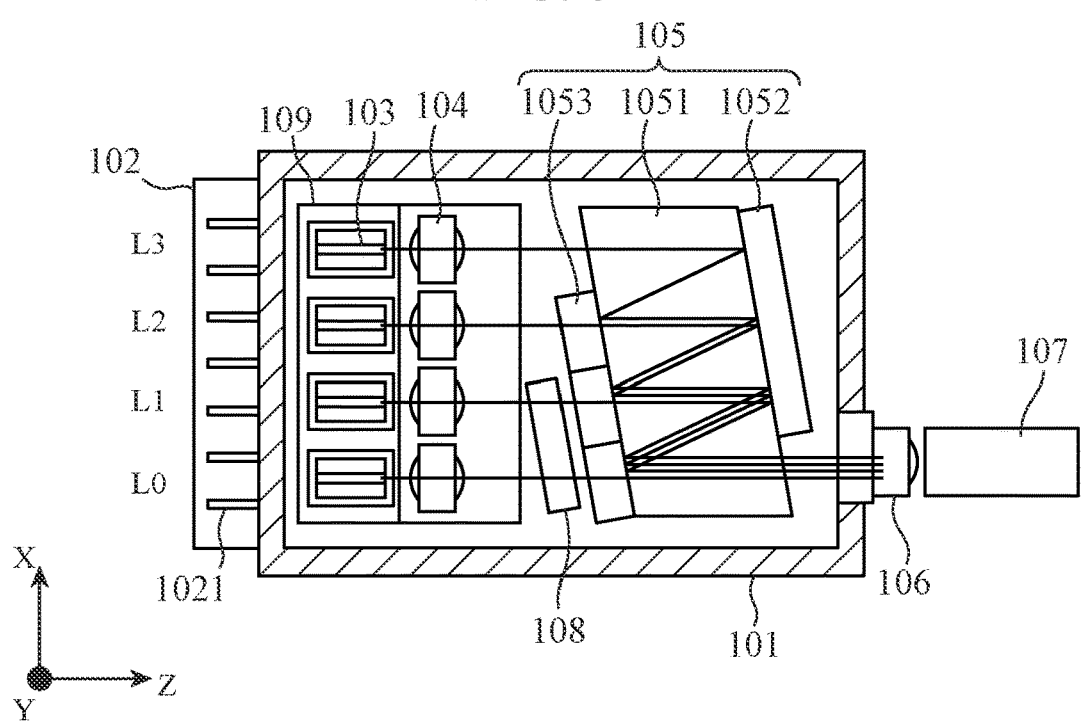
FIG. 8 is a top view illustrating another example of the configuration of the optical transmission module according to the second embodiment of the present invention (in the case where four lanes are provided).

In the above description, the case where the optical blocks 108 are each provided on a plurality of optical paths is illustrated. This is, however, not a limitation, and, as illustrated in FIG. 8, one optical block 108 may be provided on the plurality of optical paths. In FIG. 8, one optical block 108 is provided on the optical paths of L0 and L1.

Third Embodiment

Figure 9:
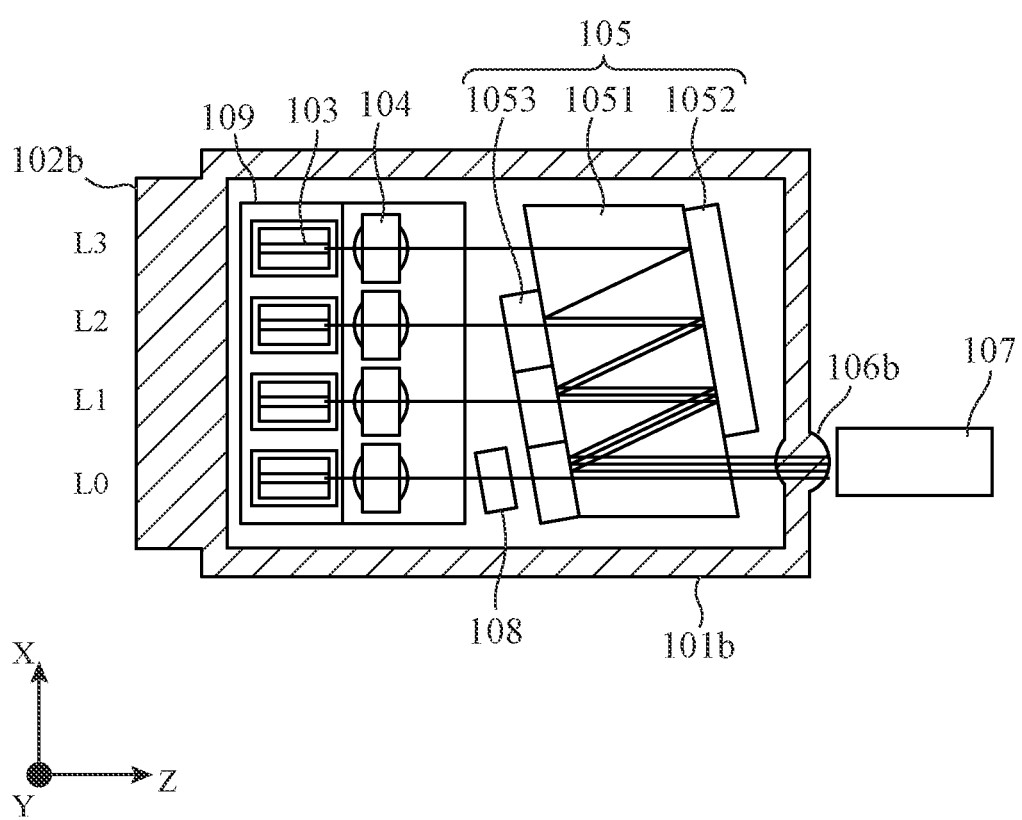
FIG. 9 is a top view illustrating an example of the configuration of an optical transmission module according to a third embodiment of the present invention (in the case where four lanes are provided).

FIG. 9 is a top view illustrating an example of the configuration of an optical transmission module according to a third embodiment of the present invention. In the optical transmission module according to the third embodiment in FIG. 9, the package 101, the feedthrough 102, and the coupling lens 106 are respectively changed to a package 101*b*, a feedthrough 102*b*, and a coupling lens 106*b* when compared to the optical transmission module according to the first embodiment in FIG. 1. Other configurations are similar, and thus the same signs are given and the description thereof is omitted.

The package 101*b* includes glass or resin mold.

The feedthrough 102*b* is integrally molded with the package 101*b*.

The coupling lens 106*b* is integrally molded with the package 101*b*.

Note that the functions of the package 101*b*, the feedthrough 102*b*, and the coupling lens 106*b* are similar to those of the package 101, the feedthrough 102, and the coupling lens 106 in the first embodiment, respectively.

Furthermore, the process of Step ST1 (process of fixing the coupling lens 106) in the flowchart in FIG. 6 is omitted in the method for manufacturing an optical transmission module according to the third embodiment.

Here, in a traditional optical transmission module having many lanes, adjustment of the position of a coupling lens is necessary, and thus a package and the coupling lens cannot be integrally molded, which causes a problem of high cost. In contrast, in the optical transmission module according to the third embodiment, adjustment of the position of the coupling lens 106*b* is unnecessary as in the first embodiment, and thus the package 101*b* and the coupling lens 106*b* can be integrally molded. As a result, the optical transmission module according to the third embodiment can reduce costs.

Although, in the above description, the optical transmission module is described as one example of the integrated optical module, the same applies to the optical reception module.

Note that, within the scope of the present invention, the present invention can have freely combined embodiments, variations of any component in each embodiment, or omissions of any component in each embodiment.

INDUSTRIAL APPLICABILITY

The integrated optical module according to the present invention includes many lanes, can achieve high coupling efficiency for all lanes without adjusting the positions and angles of an optical multi-demultiplexer and a coupling lens, and is suitable for use in, for example, an integrated optical module in which an optical system is mounted in many lanes.

REFERENCE SIGNS LIST 101, 101b: package, 102, 102b: feedthrough, 103: light emitting element (LD), 104: collimating lens, 105: optical multiplexer (optical multi-demultiplexer), 106, 106b: coupling lens, 107: SMF, 108: optical block, 109: carrier, 1011: fitting part, 1021: conductive unit, 1051: holder, 1052: mirror, 1053: BPF

The invention claimed is:

1. A method for manufacturing an integrated optical module including: a plurality of optical elements handling light having different wavelengths; a plurality of collimating lenses individually provided in the optical elements, each of the collimating lenses having a first end facing a main surface of one of the optical elements; an optical multi-demultiplexer using reflection of light caused by a spatial optical system, the optical multi-demultiplexer having a first end facing a second end of each of the collimating lenses; a coupling lens having a first end facing a second end of the optical multi-demultiplexer; a single mode optical fiber having one end facing a second end of the coupling lens; and an optical block, which is transparent, provided on one optical path among a plurality of optical paths between the collimating lenses and the optical multi-demultiplexer, the one optical path having a small number of reflections in the optical multi-demultiplexer, the method comprising:

fixing the optical multi-demultiplexer firmly;

adjusting a position of each of the collimating lenses and a position of the single mode optical fiber for corresponding one of the optical paths and actually measuring a shift amount of the single mode optical fiber at which a coupling efficiency is maximized with respect to a shift amount of each of the collimating lenses;

calculating the position of the single mode optical fiber and an angle of the optical block at which a maximum value of beam eccentricity is minimized by referring to the actually measuring result; and adjusting and fixing the position of each of the collimating lenses, the position of the single mode optical fiber, and the angle of the optical block by referring to the calculating result.

* * * * *